(12) United States Patent
Pierre

(10) Patent No.: US 9,939,138 B2
(45) Date of Patent: Apr. 10, 2018

(54) FLASHLIGHT MOUNT

(71) Applicant: LIFE MOUNTS, LLC, Goleta, CA (US)

(72) Inventor: Christoph Roger Pierre, Santa Barbara, CA (US)

(73) Assignee: LIFE MOUNTS, LLC, Goleta, CA (US)

( * ) Notice: Subject to any disclaimer, the term of this patent is extended or adjusted under 35 U.S.C. 154(b) by 0 days.

(21) Appl. No.: 15/083,593

(22) Filed: Mar. 29, 2016

(65) Prior Publication Data

US 2016/0312988 A1   Oct. 27, 2016

Related U.S. Application Data

(60) Provisional application No. 62/175,366, filed on Jun. 14, 2015, provisional application No. 62/153,129, filed on Apr. 27, 2015.

(51) Int. Cl.
*F16B 1/00* (2006.01)
*F21V 21/14* (2006.01)
*F21V 21/08* (2006.01)

(52) U.S. Cl.
CPC ............. *F21V 21/145* (2013.01); *F16B 1/00* (2013.01); *F21V 21/0816* (2013.01)

(58) Field of Classification Search
CPC ....... F16B 1/00; F21V 21/0816; F21V 21/145
USPC ........................................................ 362/418
See application file for complete search history.

(56) References Cited

U.S. PATENT DOCUMENTS

| | | | | |
|---|---|---|---|---|
| 7,390,110 B2* | 6/2008 | Katz | ...................... | F21V 21/30 362/382 |
| 8,979,060 B1* | 3/2015 | Olsson | ................ | F16M 11/041 248/309.1 |
| 2007/0285934 A1* | 12/2007 | Carillo | ...................... | B62J 6/00 362/473 |
| 2013/0194784 A1* | 8/2013 | Yu | ...................... | F21V 21/0816 362/108 |

OTHER PUBLICATIONS

Banggood, Dec. 23, 2014, <URL: https://web.archive.org/web/20141223184958/http://www.banggood.com/Wholesale-Flashlight-Mount-Holder-Clip-LED-Bicycle-Bike-Torch-360-p-41677.html> [retrieved on Jul. 18, 2017].*
budgetlightforum.com, "Mounting a flashlight to a bicycle", website, retrieved Mar. 29, 2016, 26 pages, published by BudgetLightForum.com at http://budgetlightforum.com/node/9785.

(Continued)

*Primary Examiner* — Toan Ly
(74) *Attorney, Agent, or Firm* — Alleman Hall Creaman & Tuttle LLP

(57) ABSTRACT

A flashlight mounting system includes a first elastomeric mount portion, a second elastomeric mount portion, and a fastener having a shaft that secures the first and second elastomeric mount portions to each other. The first and second elastomeric mount portions are able to rotate relative to each other about the shaft. The flashlight mounting system further includes a first strap that passes through the first elastomeric mount portion to secure the first elastomeric mount portion to a flashlight, and a second strap that passes through the second elastomeric mount portion to secure the second elastomeric mount portion to a support structure.

11 Claims, 9 Drawing Sheets

(56) References Cited

OTHER PUBLICATIONS

MECO, "MECO(TM) 360° Swivel Cycling Bike Flashlight Torch Mount Clip Clamp", website, retrieved Mar. 29, 2016, 2 pages, published by Amazon.com at http://amzn.com/B00FZD2VE0.
Lightscastle, "SODIAL(R) Universal Adjustable Bike Bicycle Mount for LED Flashlights Torch", website, retrieved Mar. 29, 2016, 2 pages, published by Amazon.com at http://amzn.com/B00A46W77Y.
Twofish, "Two Fish Lockblocks Flashlight Holder", website, retrieved Mar. 29, 2016, 2 pages, published by Amazon.com at http://amzn.com/B001CJXB5E.
BUDGETLIGHTFORUM.COM, "Mounting a flashlight to a bicycle", website, retrieved Mar. 29, 2016, 26 pages, published by BudgetLightForum.com at http://budgetlighfforum.com/node/9785.

* cited by examiner

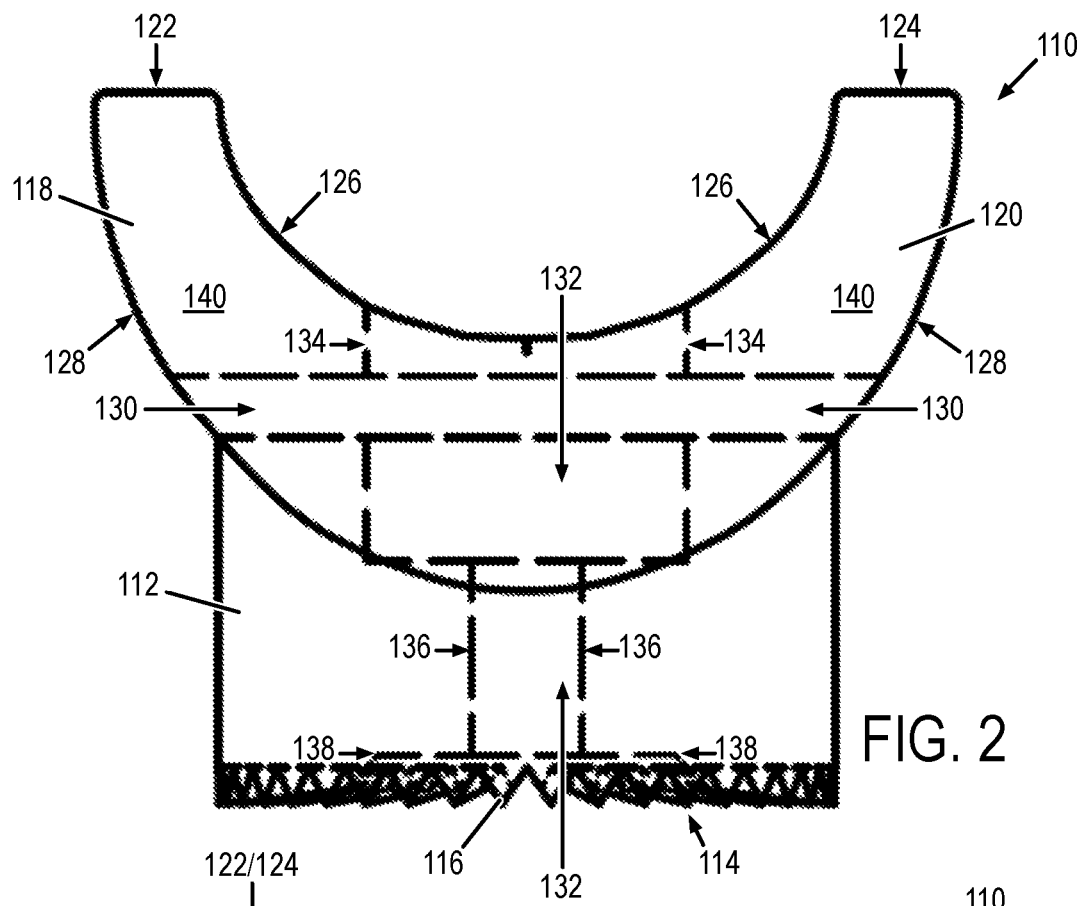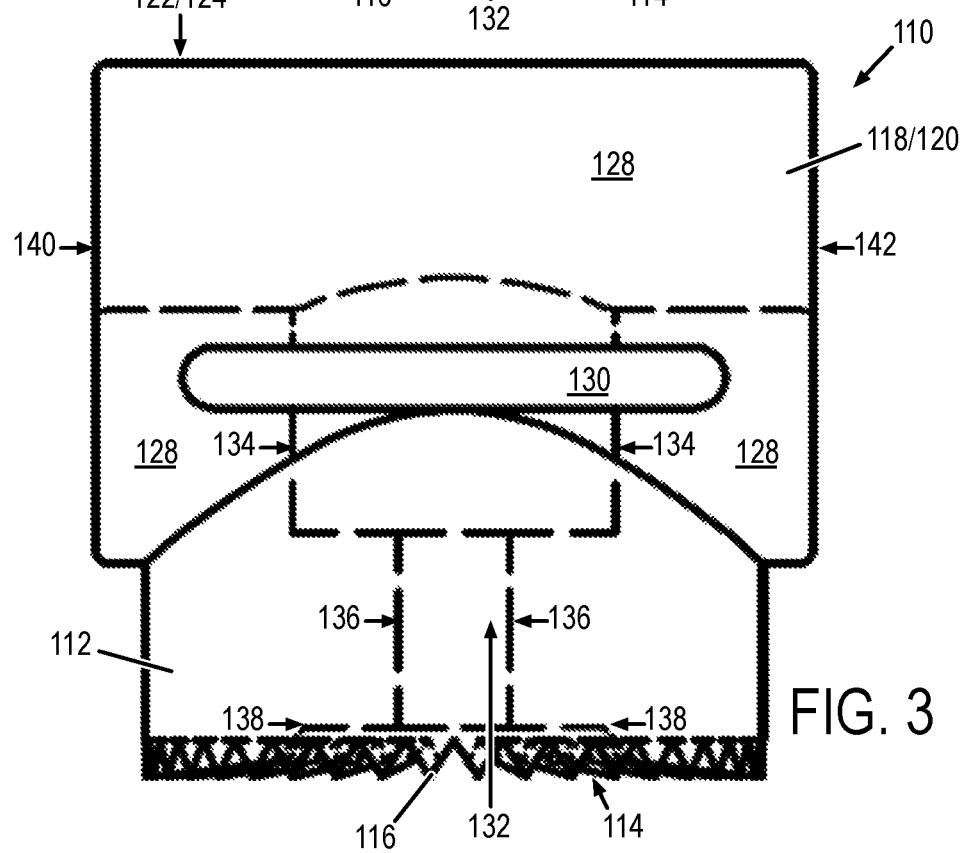

FLASHLIGHT MOUNT

CROSS-REFERENCE TO RELATED APPLICATION

The present application is a non-provisional application of and claims priority to U.S. provisional patent application No. 62/175,366, titled "A flashlight mount, and a method for mounting a flashlight, to a backpack shoulder strap", filed Jun. 14, 2015, the entire contents of which are incorporated herein by reference in their entirety for all purposes. The present application is also a non-provisional application of and claims priority to U.S. provisional patent application No. 62/153,129, titled "A flashlight mount, and a method for mounting a flashlight, to any rounded structure", filed Apr. 27, 2015. The entire contents of each of these provisional patent applications are incorporated herein by reference in their entirety for all purposes.

BACKGROUND

Hand operated flashlights are used in a variety of contexts as a source of artificial light. A challenge for many flashlight users is the ability to hold and direct the flashlight while also retaining use of their hands for other tasks. Often, flashlight users will hold flashlights in their mouth, balance the flashlight on or against another object, or request assistance from another person in order to free up one of their hands.

SUMMARY

A flashlight mounting system disclosed herein includes a first elastomeric mount portion, a second elastomeric mount portion, and a fastener having a shaft that secures the first and second elastomeric mount portions to each other. The first and second elastomeric mount portions are able to rotate relative to each other about the shaft. The flashlight mounting system further includes a first strap that passes through the first elastomeric mount portion to secure the first elastomeric mount portion to a flashlight (or other suitable object), and a second strap that passes through the second elastomeric mount portion to secure the second elastomeric mount portion to a support structure.

In an example, each elastomeric mount portion includes a barrel having a rim that forms an interface surface at a distal end of the barrel. The first interface surface may have a set of teeth that are continuous along the rim of the barrel, and that interface with corresponding teeth on the other elastomeric mount portion. Each elastomeric mount portion further includes a pair of mounting arms that project outward from an opposite end of the first barrel. The mounting arms collectively form a tapering arc that defines a curved mounting surface along an interior of the tapering arc. Each mounting arm forms an arc segment of the tapering arc that tapers from a base of that mounting arm that joins with the barrel to a distal end of that mounting arm.

This summary provides only a sample of the subject matter described in further detail by the detailed description and associated drawings. Accordingly, claimed subject matter is not limited by this summary.

BRIEF DESCRIPTION OF DRAWINGS

FIGS. 2-7 depict an example elastomeric mount portion.

DETAILED DESCRIPTION

A flashlight mounting system disclosed herein includes a first elastomeric mount portion, a second elastomeric mount portion, and a fastener having a shaft that secures the first and second elastomeric mount portions to each other. The first and second elastomeric mount portions are able to rotate relative to each other about the shaft. The flashlight mounting system further includes a first strap that passes through the first elastomeric mount portion to secure the first elastomeric mount portion to a flashlight (or other suitable object), and a second strap that passes through the second elastomeric mount portion to secure the second elastomeric mount portion to a support structure.

Figure 1:
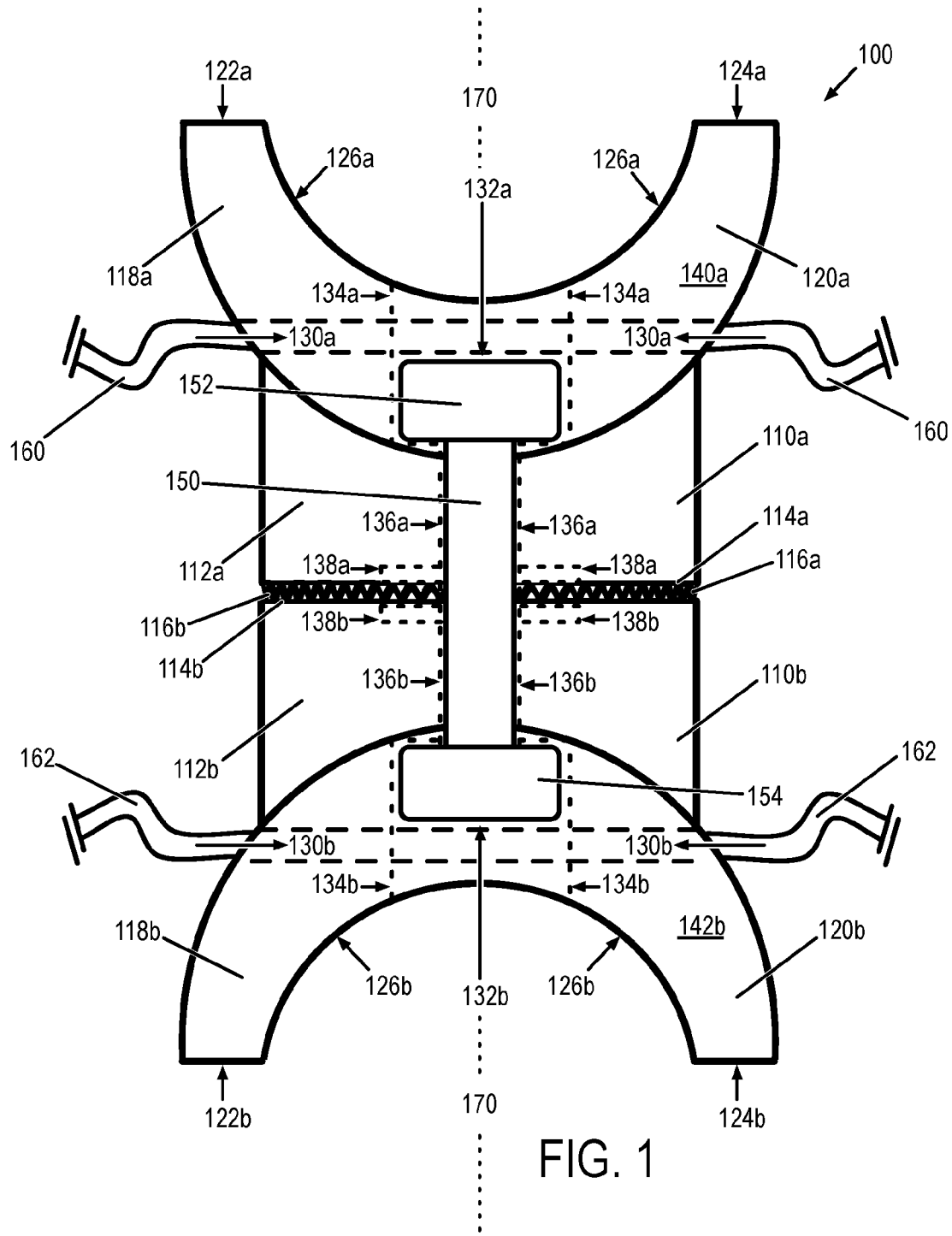
FIG. 1 depicts an example flashlight mounting system.

FIG. 1 depicts an example flashlight mounting system 100. Flashlight mounting system 100 includes a first elastomeric mount portion 110a and a second elastomeric mount portion 110b that are secured to each other or otherwise joined by a shaft 150. First elastomeric mount portion 110a and second elastomeric mount portion 110b are able to rotate relative to each other about shaft 150. An axis of rotation 170 of first elastomeric mount portion 110a and a second elastomeric mount portion 110b is depicted in FIG. 1 as passing through a longitudinal axis of shaft 150. Rotation of first elastomeric mount portion 110a relative to second elastomeric mount portion 110b about axis of rotation 170 enables a user to adjust an orientation of objects retained by or otherwise secured to the mount portions.

In this example, first elastomeric mount portion 110a is identical or substantially identical to second elastomeric mount portion 110b. In other examples, first elastomeric mount portion 110a and second elastomeric mount portion 110b may have different physical configurations relative to each other. However, an advantage of first elastomeric mount portion 110a and second elastomeric mount portion 110b being identical or substantially identical to each other enables these parts to be formed from the same mold and/or manufacturing process, thereby reducing the cost and complexity of manufacturing and assembling the flashlight mounting system.

First elastomeric mount portion 110a includes a first barrel 112a having a rim that forms a first interface surface 114a at a distal end of the first barrel. First interface surface 114a has a first set of teeth 116a that are continuous along the rim of the first barrel. Second elastomeric mount portion 110b includes a second barrel 112b having a rim that forms a second interface surface 114b at a distal end of the second barrel. Second interface surface 114b has a second set of teeth 116b that are continuous along the rim of the second barrel.

First interface surface 114a and second interface surface 114b interface with each other in which first set of teeth 116a interface and engage with second set of teeth 116b to resist rotation of first elastomeric mount portion 110a relative to second elastomeric mount portion 110b about shaft 150 and axis of rotation 170. A user may overcome this resistance to rotation provided by elastomeric features of portions 110a and 110b, including teeth 116a and 116b, by twisting first elastomeric mount portion 110a relative to second elastomeric mount portion 110b using a hand-applied twisting force. This twisting force is sufficient to cause deformation of teeth 116a and 116b to allow the teeth of opposing mount portions to pass over or past each other, thereby permitting rotation of first mount portion 110a relative to second mount portion 110b. Additionally or alternatively, a user may draw first elastomeric mount portion 110a away from second elastomeric mount portion 110b against a compression force provided by shaft 150 through deformation of these elements to partially disengage and thereby reduce the resistance to rotation provided by teeth 116a and 116b.

As a non-limiting example, the twisting force needed to overcome the resistance to rotation provided by the engaged teeth without drawing apart the elastomeric mount portions may be designed to be equal to or less than commonly available food jars, while also being sufficient to maintain a flashlight in any orientation. In another non-limiting example, the twisting force needed to overcome resistance to rotation provided by the engaged teeth without drawing apart the elastomeric mount portions may be designed to be greater than a reasonable hand-applied twisting force, but may be reduced by a user to a reasonable hand-applied twisting force by drawing the elastomeric mount portions apart from each other in combination with application of the twisting force.

First elastomeric mount portion 110a further includes a first pair of mounting arms 118a and 120a that project outward from an opposite end of the first barrel. Mounting arms 118a and 120a collectively form a first tapering arc that defines a first curved mounting surface 126a along an interior of the first tapering arc. A profile of this first tapering arc is depicted in FIG. 1 along with a side surface 140a. Each mounting arm of mounting arms 118a and 120a forms an arc segment of this first tapering arc that tapers from a base of the mounting arm that joins with the first barrel to a distal end of the mounting arm. The distal ends of mounting arms 118a and 120a terminate at surfaces 122a and 124a, respectively.

Second elastomeric mount portion 110b further includes a second pair of mounting arms 118b and 120b that project outward from an opposite end of the second barrel. Mounting arms 118b and 120b collectively form a second tapering arc that defines a second curved mounting surface 126b along an interior of the second tapering arc. A profile of this second tapering arc is depicted in FIG. 1 along with a side surface 142b. Each of mounting arms 118b and 120b forms an arc segment of the second tapering arc that tapers from a base of the mounting arm that joins with the second barrel to a distal end of the mounting arm. The distal ends of mounting arms 118b and 120b terminate at surfaces 122b and 124b, respectively.

A first channel 130a is formed in the first pair of mounting arms 118a and 120a. First channel 130a passes through each of mounting arms 118a and 120a. In another example, first channel 130a may pass through barrel 112a. A first strap 160 passes through first channel 130a of first elastomeric mount portion 110a. A second channel 130b is formed in the second pair of mounting arms 118b and 120b. Second channel 130b passes through each of mounting arms 118b and 120b. In another example, second channel 130b may pass through second barrel 112b. A second strap 162 passes through second channel 130b of second elastomeric mount portion 110b.

Figure 10:
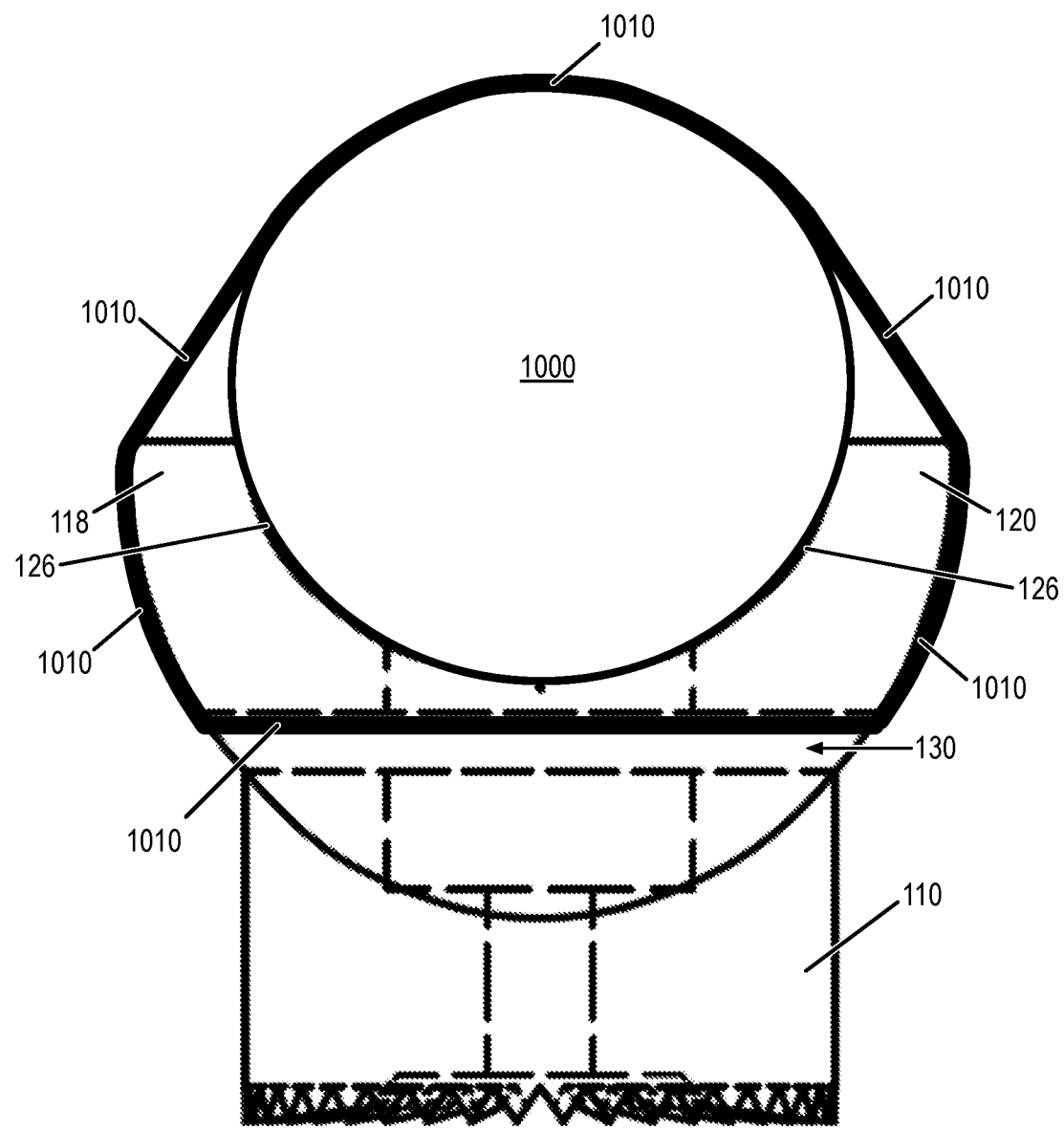
FIG. 10 depicts an example use-environment for the elastomeric mount portion of FIGS. 2-7.

A body of a flashlight (typically a cylindrical or curved body) may interface with one of curved mounting surfaces 126a or 126b of elastomeric mount portions 110a or 110b, and then be secured in place by one of straps 160 or 162. A mounting structure such as a round or cylindrical pole, beam, shaft, arm, or other structural element may interface with another one of curved mounting surfaces 126a or 126b of elastomeric mount portions 110a or 110b, and then be secured in place by another of straps 160 or 162. Once a flashlight has been secured to a mounting structure by flashlight mounting system 100, an orientation of the flashlight relative to the mounting structure may be changed by rotating elastomeric mount portion 110a relative to elastomeric mount portion 110b about shaft 150 and the axis of rotation 170. A non-limiting example of an object 1000 being secured to a mounting surface 126 by a strap 1010 is depicted in FIG. 10, in which mount portion 110 refers to either of mount portions 110a or 110b, and strap 1010 may refer to either of straps 160 or 162.

In an example, straps 160 and 162 may each include a buckle frame located at a first end of the strap through which an opposite end of the strap may be passed to form a loop. Each strap may have a hook and loop fastener (e.g., Velcro) located on a first side of the strap with either one of the loop or hook elements being located at or along an end region of the strap opposite the buckle frame, and the other of the loop or hook elements being located at or along an intermediate region of the strap. The hook and loop fastener may be secured upon itself once the end of the strap opposite the buckle frame is passed through the buckle frame to form a loop that secures the elastomeric mount portion to either a flashlight or to a suitable mounting structure. As another example, the strap may have a buckle or clasp located at a first end with holes located along an intermediate region of the strap to accommodate a prong of the buckle or clasp. As yet another example, the strap may have releasable clips located at each end, with at least one of the clips having a buckle frame that enables a length of the strap that forms a loop to be shortened or lengthened. As yet another example, a strap may include hook and loop fasteners (e.g., Velcro) without inclusion of a buckle frame or clip. Other suitable straps or strap securing techniques may be used to secure an elastomeric mount portion to a flashlight or mounting structure.

Shaft 150 may take the form of a non-elastomeric shaft. As an example, shaft 150 may be formed from a metal such as steel or aluminum, or a hard plastic. Shaft 150 secures first elastomeric mount portion 110a to second elastomeric mount portion 110b. When secured by shaft 150, first interface surface 114a may be compressed onto second interface surface 114b, which may include at least some deformation of first elastomeric mount portion 110a and second elastomeric mount portion 110b. In other examples, shaft 150 may maintain first interface surface 114a in contact with second interface surface 114b without compressing first mount portion 110a onto second mount portion 110b and/or without causing deformation of the first or second mount portions. Shaft 150 passes through at least a portion of first barrel 112a and at least a portion of second barrel 112b along a longitudinal axis of both the first barrel and the second barrel. As an example, first elastomeric mount portion 110a may have a first bore 132a defined therein, and second elastomeric mount portion 110b may have a second bore 132b defined therein through which shaft 150 passes. Here, axis of rotation 170 corresponds to the longitudinal axis of barrels 112a and 112b and their respective bores 132a and 132b.

In this example, first bore 132a includes a first bore segment 134a, a second bore segment 136a, and a third bore segment 138a. Second bore segment 136a is narrower than first and third bore segments 132a and 136a, in this example. A first flanged portion 152 located at a first end of shaft 150 interfaces with a widening transition between first bore segment 134a and second bore segment 136a to resist or preclude removal of shaft 150 from first bore 132a in a direction of the first interface surface 114a. Also in this example, second bore 132b includes a first bore segment 134b, a second bore segment 136b, and a third bore segment 138b. Second bore segment 136b is narrower than first and third bore segments 132b and 136b, in this example. A second flanged portion 154 located at a second end of shaft 150 interfaces with a widening transition between first bore segment 134b and second bore segment 136b to resist or preclude removal of shaft 150 from second bore 132b in a direction of the second interface surface 114b.

Shaft 150 in combination with flanged portions 152 and 154 may be referred to collectively as a fastener or a fastening system. This fastener or fastening system enables rotation of first mount portion 110a relative to second mount portion 110b, while also securing and/or compressing first mount portion 110a and second mount portion 110b towards each other. As a non-limiting example, shaft 150 may take the form of a cylindrical shaft of a tubular rivet, first flanged portion 152 may refer to one of a head or a tail of the rivet, and second flanged portion 154 may refer to the other one of the head or the tail of the rivet. In at least some examples, a washer may be disposed between an interfacing surface of the tail of the rivet and a surface formed by a widening transition between bore segments 134a/136a or between bore segments 134b/136b depending on the orientation of the rivet. Additionally or alternatively, in at least some examples, a washer may be disposed between an interfacing surface of the head of the rivet and a surface formed by a widening transition between bore segments 134a/136a or between bore segments 134b/136b depending on the orientation of the rivet. Other suitable fasteners or fastening systems may be used to join and secure first elastomeric mount portion 110a and second elastomeric mount portion 110b.

FIGS. 2-7 depict features of an example elastomeric mount portion 110 in further detail. Elastomeric mount portion 110 refers to any of previously described first and second elastomeric mount portions 110a and 110b. Accordingly, within FIGS. 2-7, the "a" and "b" designations have been omitted from the reference numerals.

FIG. 2 depicts elastomeric mount portion 110 in the same or similar orientation (e.g., side orientation) as depicted in FIG. 1 with reference to first and second elastomeric mount portions 110a and 110b. FIG. 3 depicts elastomeric mount portion 110 rotated 90 degrees about a vertical axis, which corresponds to axis of rotation 170 in FIG. 1. Additional surfaces of mounting arms 118 and 120 are further identified in FIGS. 2 and 3 by reference numerals 128, 140, and 142. Within FIG. 3, an example profile of channel 130 is depicted as having an elongated oval, however, channel 130 may have a rectangular shape in other examples. These shapes for channel 130 may accommodate a strap or belt having a substantially flat shape when viewed in section.

Figure 4:
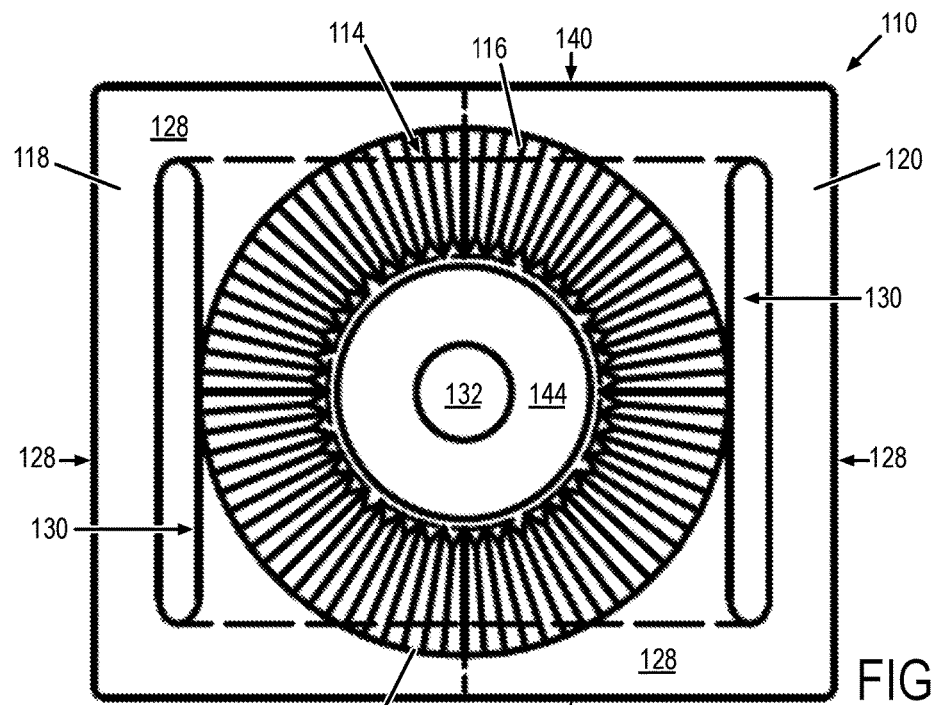
Figure 5:
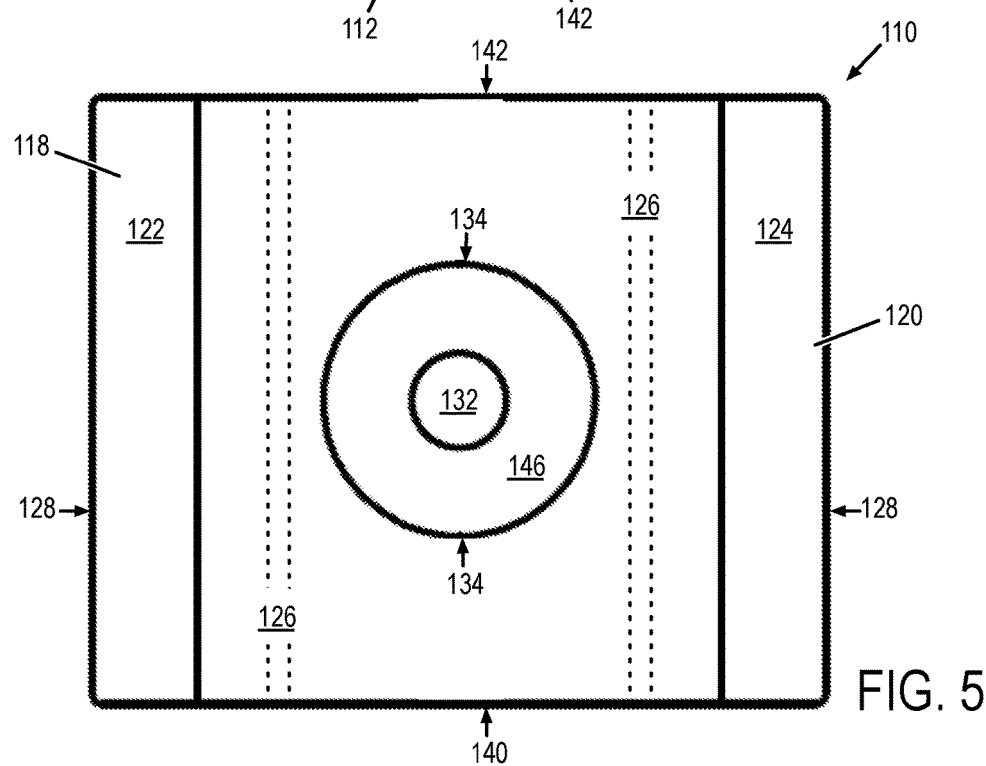

FIGS. 4 and 5 depict elastomeric mount portion 110 at orientations in which the elastomeric mount portion is being viewed along axis of rotation 170 in FIG. 1. FIG. 4 depicts an interface surface 114 side of elastomeric mount portion 110. FIG. 5 depicts an opposite side of elastomeric mount portion 110 to provide a view of curved mounting surface 126. Surfaces 122 and 124 located at the distal ends of mounting arms 118 and 120 are also depicted in FIG. 5. FIGS. 4 and 5 further depict aspects of bore 132, including surface 144 forming a widening transition between bore segments 138 and 136, and surface 146 forming a widening transition between bore segments 134 and 136. As previously described, a flanged portion located at an end of shaft 150 or washer interfacing with that flanged portion may interface with surface 146 that forms a widening transition between bore segments 134 and 136. Referring also to FIG. 1, surface 146 formed at a widening transition between bore segments 134 (134a/b) and 136 (136a/b) is located between channel 130 (130a/b) and interfacing surface 114 (114a/b) as measured along axis of rotation 170.

Figure 6:
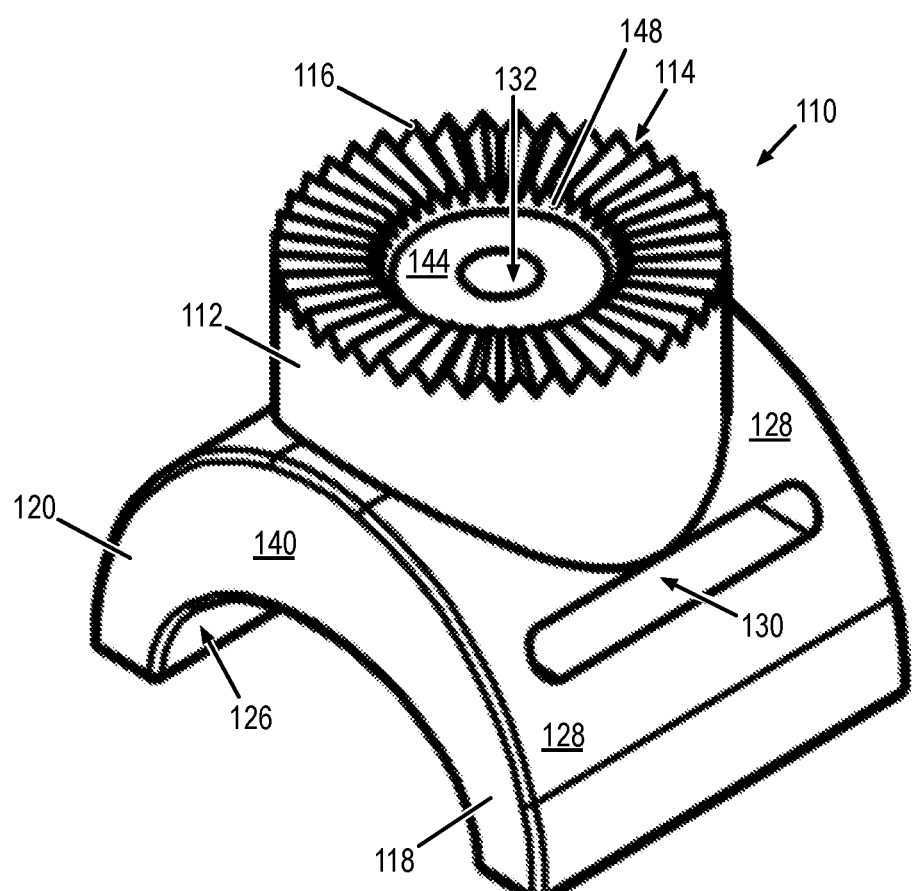
Figure 7:
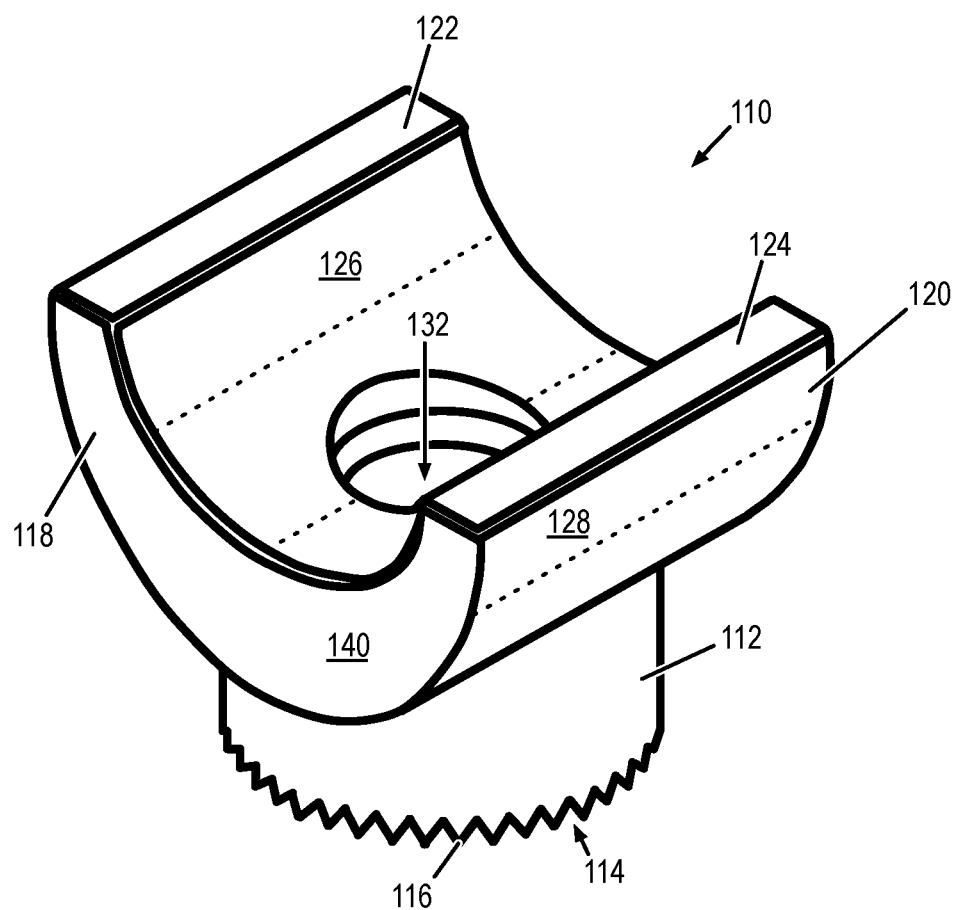

FIGS. 6 and 7 provide isometric views of elastomeric mount portion 110. FIG. 6 provides a detailed view of interface surface 114 and teeth 116. Within FIG. 6, an annular chamfer 148 forms a transition from teeth 116 to surface 144. Chamfer 148 and/or a recessed region formed by bore segment 138 may provide for easier rotation and/or a more consistent resistance to rotation about the axis of rotation 170 due to a reduction in surface area that contacts another opposing elastomeric mount portion. Additionally or alternatively, this chamfer may be applied to an inner annular edge of teeth 114 to provide better meshing or mating with an opposing set of teeth, thereby providing easier rotation and/or a more consistent resistance to rotation about the axis of rotation 170.

Each elastomeric mount portion may be formed from a unitary (i.e., single) piece of elastomeric material. At least some of the advantages of using a unitary piece of elastomeric material to form the elastomeric mount portion include cost reduction, ease of manufacture, and ease of assembly. For example, a single mold or separate instances of the same mold may be used to create each elastomeric mount portion. The flashlight mounting system may be assembled by combining two instances of the elastomeric mount portion.

Forming the mount portion from an elastomeric material may also provide a number of advantages. First, the mounting arms of the elastomeric mount portion formed from an elastomeric material are able to deform to accommodate a flashlight or mounting structure having a variety of different sizes and shapes. This deformation may provide a compression force on the flashlight or mounting structure when used in combination with a strap. In at least some use scenarios, the tapering of a width of the mounting arms and/or the arc shape of the mounting arms in combination with the elastomeric material may provide a suitable compression force profile along an interface between the curved mounting surface 126 and the flashlight or mounting structure. Second, the elastomeric material of the mounting arms provides increased friction and/or gripping force (e.g., along the curved mounting surfaces) on the flashlight or mounting structure as compared to other materials. Third, the barrel of the elastomeric mount portion being also formed from an elastomeric material enables the barrel to deform under a compression force applied via shaft 150 along the axis of rotation 170, thereby enabling the flashlight mounting system to maintain its rotational orientation under typical flashlight loads while also enabling a user to overcome at least some of this compression force to selectively adjust the orientation of the flashlight.

Providing a suitable user experience with regards to adjustability of the orientation of the flashlight mounting system and holding capability for a flashlight across a range of orientations may rely on balancing the compression force provided by the fastener or fastening system with the size and shape of the teeth and with the material properties (e.g., modulus of elasticity of the elastomeric material). As an example, teeth 116 may have a tooth depth of approximately 1.50 mm (within a range of +/−10% or 20%) and a tooth spacing of approximately 1.96 mm (within a range of +/−10% or 20%) along the rim of barrel 112 having a circular outer diameter of 25 mm (or within a range between 22 mm and 29 mm). In this example, an inner diameter of bore 138 may be approximately 12 mm (within a range of +/−10% or 20%). It will be understood that these dimensions are provided for illustrative purposes and to provide relative proportions of a specific implementation. Accordingly, these dimensions are non-limiting with respect to the features and configurations described herein.

Figure 8:
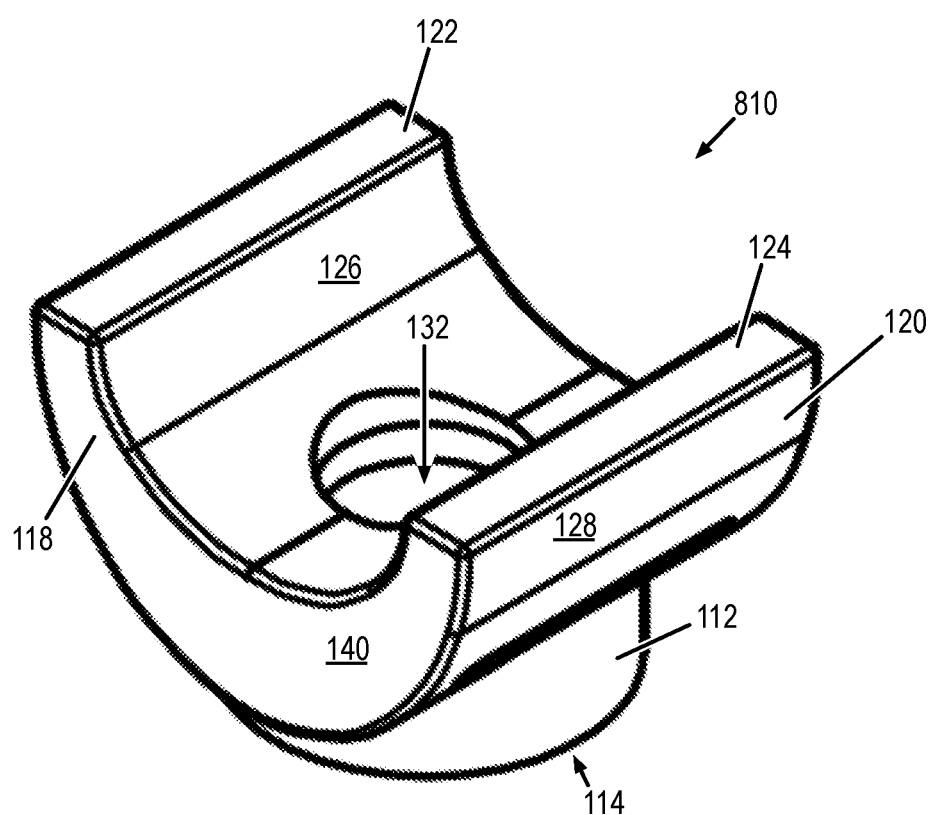
FIGS. 8 and 9 depict another example elastomeric mount portion.
Figure 9:
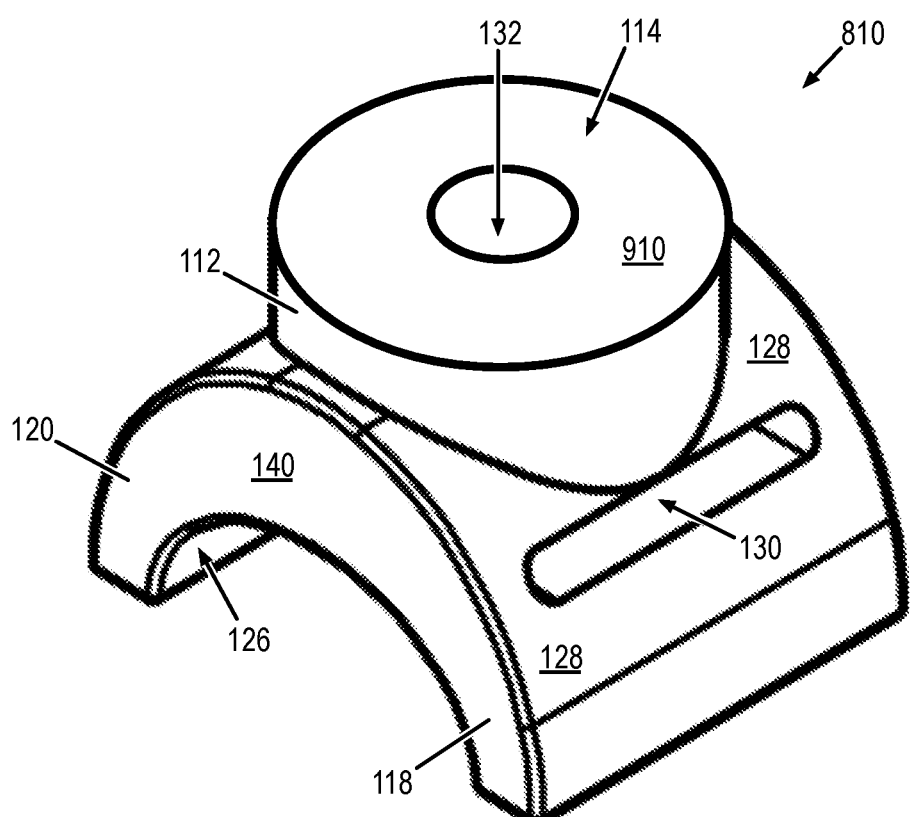

FIGS. 8 and 9 depict another example elastomeric mount portion 810. Elastomeric mount portion 810 includes many of the same features and components as previously described with reference to mount portion 110 of FIGS. 2-7 or with reference to mount portions 110a and 110b of FIG. 1. Accordingly, like reference numerals in FIGS. 8 and 9 refer to the same features and components as previously used with reference to FIGS. 1-7 and associated description.

In contrast to previously described mount portions 110, 110a, and 110b, mount portion 810 may be used on its own (i.e., without a second mount portion and fastener joining mount portion 810 to a second mount portion) to secure a flashlight to another object. In the example depicted in FIG. 8, interface surface 114 of mount portion 810 does not include teeth. And, as depicted in FIG. 9, for example, interface surface 114 of mount portion 810 provides a mounting surface 910 that interfaces with an object to which the mount portion 810 is to be secured. In this example, mounting surface 910 is a flat mounting surface (i.e., is normal to an axis of barrel 112).

In at least some implementations, mount portion 810 may be formed from the same or similar mold as previously described mount portions 110, 110a, and 110b in which teeth 116 may be removed by cutting barrel 112 across its section. This cutting operation may additionally provide the benefit of shortening an overall length of barrel 112, which brings the mounting arms 118 and 120 in closer to a distal end of the barrel defined by interface surface 114 and mounting surface 910. In other implementations, mount portion 810 may be formed from a different mold as compared to previously described mount portions 110, 110a, and 110b. In this implementation, bore 132 may be optionally omitted. In still further implementations, mounting surface 910 may include surface texture and/or interface surface 114 may include teeth 116. In some implementations, bore 132 may provide an advantage of allowing air to escape from or enter between mounting surface 910 and an object to which the mounting surface 910 interfaces, thereby reducing or eliminating trapped air and/or suction between interfacing surfaces.

FIG. 9 depicts mount portion 810 as including previously described channel 130. In the context of mount portion 810, channel 130 may accommodate two straps, such as previously described straps 160 and 162. A first of these two straps may be used to secure and retain a flashlight within a region defined by curved mounting surface 126. A second of these two straps may be used to secure and retain mounting surface 910 to another object. In at least some examples, this other object may take the form of a third strap (e.g., a shoulder strap of a backpack) or other suitable object.

Figure 11:
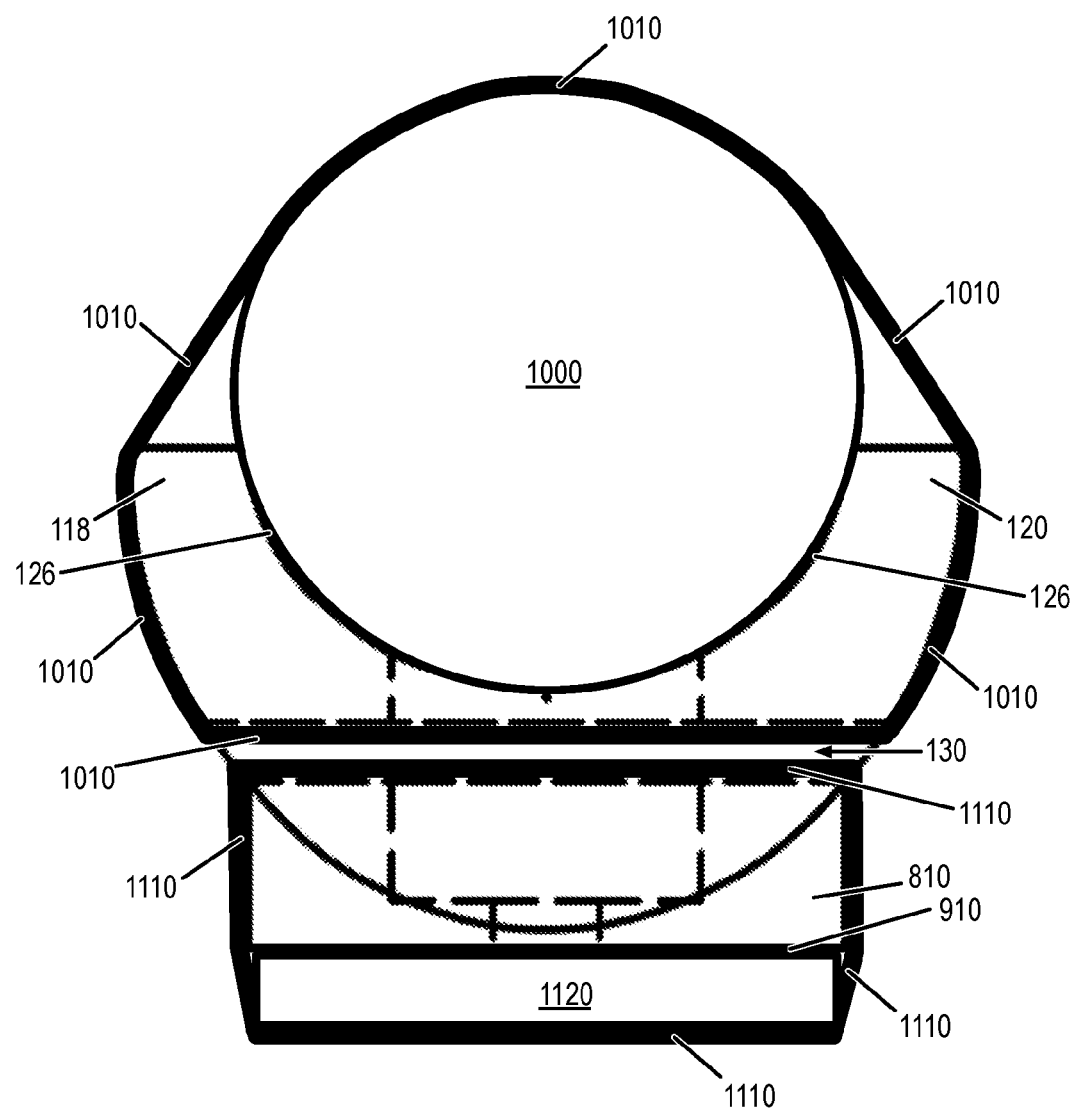
FIG. 11 depicts an example use-environment for the elastomeric mount portion of FIGS. 8 and 9.

FIG. 10 depicts an example use-environment for the elastomeric mount portion of FIGS. 2-7. In FIG. 10, strap 1010 passes through channel 130 of mount portion 110 and secures object 1000 to surfaces 126 of mounting arms 118 and 120. FIG. 11 depicts an example use-environment for the elastomeric mount portion of FIGS. 8 and 9. In FIG. 11, strap 1010 passes through channel 130 of mount portion 810 and secures object 1000 to surfaces 126 of mounting arms 118 and 120. Additionally, strap 1110 passes through channel 130 of mount portion 810 and secures object 1120 to surface 910. In these examples, object 1000 may refer to a flashlight, a mounting support, or other suitable object, and object 1120 of FIG. 11 may refer to another strap or other suitable object to which the mount portion is secured.

While the various mount portions are described herein with respect to a flashlight, it will be understood that these various mount portions may be used outside of the flashlight context to secure any object to another object. Typically, curved mounting surface 126 is suitable for securing and interfacing with rounded and/or barrel-shaped objects. However, deformation of mounting arms 118 and 120 (enabled by the elastomeric material) may enable the various mount portions described herein to accommodate non-rounded or non-barrel-shaped objects.

The elastomeric components described herein may be formed from any suitable elastomeric material. As a non-limiting example, include this elastomeric material may include or consist of silicone rubber with a hardness of shore 70A. However, other suitable elastomeric materials may be used or included. Non-limiting examples of other suitable elastomeric materials include Nitrile (Buna-N) Rubber, natural rubber (e.g., including Polyisoprene), EPDM rubber, Viton, and other forms of silicone rubber or combinations of these and/or other materials.

It will be understood that the embodiments, and implementations described herein are exemplary in nature, and that these specific examples are not to be considered in a limiting sense, because numerous variations are possible. The subject matter of the present disclosure includes all novel and nonobvious combinations and sub-combinations of the various configurations, features, and/or properties disclosed herein, as well as any and all equivalents thereof.

The invention claimed is:

1. A flashlight mounting system, comprising:
a first elastomeric mount portion including:
a first barrel having a rim that forms a first interface surface at a distal end of the first barrel, the first interface surface having a first set of teeth that are continuous along the rim of the first barrel, and
a first pair of mounting arms that project outward from an opposite end of the first barrel and collectively form a first tapering arc that defines a first curved mounting surface along an interior of the first tapering arc, each mounting arm of the first pair forming an arc segment of the first tapering arc that tapers from a base of that mounting arm that joins with the first barrel to a distal end of that mounting arm,
wherein a first channel is formed in the first pair of mounting arms that passes through each mounting arm of the first pair;
a second elastomeric mount portion including:
a second barrel having a rim that forms a second interface surface at a distal end of the second barrel, the second interface surface having a second set of teeth that are continuous along the rim of the second barrel, and
a second pair of mounting arms that project outward from an opposite end of the second barrel and collectively form a second tapering arc that defines a second curved mounting surface along an interior of the second tapering arc, each mounting arm of the second pair forming an arc segment of the second tapering arc that tapers from a base of that mounting arm that joins with the second barrel to a distal end of that mounting arm,
wherein a second channel is formed in the second pair of mounting arms that passes through each mounting arm of the second pair; and a non-elastomeric shaft securing the first elastomeric mount portion to the second elastomeric mount portion in which the first interface surface is compressed onto the second interface surface, the shaft passing through at least a portion of the first barrel and at least a portion of the second barrel along a longitudinal axis of both the first barrel and the second barrel.

2. The flashlight mounting system of claim 1, wherein the shaft forms part of a fastener that further includes:
a first flanged portion located within a first bore of the first elastomeric mount portion that interfaces with a narrowing region of the first bore, and
a second flanged portion located within a second bore of the second elastomeric mount portion that interfaces with a narrowing region of the second bore.

3. The flashlight mounting system of claim 2, wherein the fastener is a rivet, and wherein the rivet compresses the first elastomeric mount portion onto the second elastomeric mount portion with the first and second set of teeth in a mated configuration.

4. The flashlight mounting system of claim 1, wherein the first elastomeric mount portion and the second elastomeric mount portion are each formed from silicone rubber.

5. The flashlight mounting system of claim 1, further comprising:
a first strap that passes through the first channel to secure a first object to the first curved mounting surface; and
a second strap that passes through the second channel to secure a second object to the second curved mounting surface.

6. The flashlight mounting system of claim 1, wherein one of the first or second objects is flashlight.

7. The flashlight mounting system of claim 1, wherein the first elastomeric mount portion is rotatable relative to the second elastomeric mount portion about the longitudinal axis by twisting the first elastomeric mount portion relative to the second elastomeric mount portion while deforming one or more of the first elastomeric mount portion and/or the second elastomeric mount portion.

8. The flashlight mounting system of claim 7, wherein deformation of the first elastomeric mount portion and/or the second elastomeric mount portion includes deformation of one or more teeth of the first and second sets of teeth.

9. The flashlight mounting system of claim 7, wherein deformation of the first elastomeric mount portion and/or the second elastomeric mount portion includes deformation of one or more teeth of the first and second barrels to disengage the first set of teeth from the second set of teeth.

10. The flashlight mounting system of claim 1, wherein which the first interface surface is compressed onto the second interface surface by deformation of the first elastomeric mount portion and the second elastomeric mount portion.

11. A flashlight mounting system, comprising:
a first elastomeric mount portion including:
a first barrel having a rim that forms a first interface surface at a distal end of the first barrel, the first interface surface having a first set of teeth that are continuous along the rim of the first barrel, and
a first pair of mounting arms that project outward from an opposite end of the first barrel and collectively form a first tapering arc that defines a first curved mounting surface along an interior of the first tapering arc, each mounting arm of the first pair forming an arc segment of the first tapering arc that tapers from a base of that mounting arm that joins with the first barrel to a distal end of that mounting arm,
wherein a first channel is formed in the first pair of mounting arms that passes through each mounting arm of the first pair;
a second elastomeric mount portion including:
a second barrel having a rim that forms a second interface surface at a distal end of the second barrel, the second interface surface having a second set of teeth that are continuous along the rim of the second barrel, and
a second pair of mounting arms that project outward from an opposite end of the second barrel and collectively form a second tapering arc that defines a second curved mounting surface along an interior of the second tapering arc, each mounting arm of the second pair forming an arc segment of the second tapering arc that tapers from a base of that mounting arm that joins with the second barrel to a distal end of that mounting arm,
wherein a second channel is formed in the second pair of mounting arms that passes through each mounting arm of the second pair;
a fastener including a non-elastomeric shaft securing the first elastomeric mount portion to the second elastomeric mount portion in which the first set of teeth and the second set of teeth are engaged with each other to resist rotation of first elastomeric mount portion relative to second elastomeric mount portion about the shaft, the shaft passing through at least a portion of the first barrel and at least a portion of the second barrel along a longitudinal axis of both the first barrel and the second barrel;
a first strap that passes through the first channel to secure a first object to the first curved mounting surface; and
a second strap that passes through the second channel to secure a second object to the second curved mounting surface.

* * * * *